(12) United States Patent
Anderson

(10) Patent No.: US 12,466,159 B2
(45) Date of Patent: Nov. 11, 2025

(54) POROUS TUBE ASSEMBLY

(71) Applicant: Arachne Labs LLC, Carlisle, PA (US)

(72) Inventor: Christopher Anderson, Tukwila, WA (US)

(73) Assignee: ARACHNE LABS LLC, Carlisle, PA (US)

(*) Notice: Subject to any disclaimer, the term of this patent is extended or adjusted under 35 U.S.C. 154(b) by 428 days.

(21) Appl. No.: 17/698,335

(22) Filed: Mar. 18, 2022

(65) Prior Publication Data
US 2022/0402195 A1 Dec. 22, 2022

Related U.S. Application Data

(60) Provisional application No. 63/211,650, filed on Jun. 17, 2021.

(51) Int. Cl.
| | |
|---|---|
| *B32B 5/02* | (2006.01) |
| *B29C 65/00* | (2006.01) |
| *B32B 3/20* | (2006.01) |
| *B32B 5/06* | (2006.01) |
| *B32B 5/14* | (2006.01) |
| *D05C 17/00* | (2006.01) |

(52) U.S. Cl.
CPC .............. *B32B 5/02* (2013.01); *B29C 66/729* (2013.01); *B32B 5/073* (2021.05); *B32B 5/14* (2013.01); *B32B 3/20* (2013.01); *D05C 17/00* (2013.01)

(58) Field of Classification Search
CPC ......... B32B 5/02; B32B 5/14; B32B 3/14–16; B32B 3/20; B32B 5/073; B29C 66/729; B29C 65/00; B33Y 80/00; D05C 17/00
See application file for complete search history.

(56) References Cited

U.S. PATENT DOCUMENTS

| | | | | |
|---|---|---|---|---|
| 4,663,057 | A * | 5/1987 | Powell, Jr. .............. | C02F 1/763 210/167.11 |
| 5,263,791 | A * | 11/1993 | Zeman .................. | F16L 11/121 239/542 |
| 10,441,027 | B2 | 10/2019 | Bartel et al. | |
| 2018/0066922 | A1* | 3/2018 | Howland ................ | B32B 23/10 |
| 2019/0046314 | A1* | 2/2019 | Levi ..................... | D03D 13/006 |

FOREIGN PATENT DOCUMENTS

DE 102013105926 A1 * 12/2014 .............. D05C 7/08

OTHER PUBLICATIONS

Translation of DE102013105926 (Year: 2014).*
ZSK Machines, "Tailored Tube Laying/Placement", https://www.zskmachines.com/technical/tailored-tube-laying-placement/, 2019, 2 pages.

* cited by examiner

*Primary Examiner* — Matthew P Travers
(74) *Attorney, Agent, or Firm* — EDELL, SHAPIRO, & FINNAN, LLC

(57) ABSTRACT

In one example, a porous tube assembly is described. The porous tube assembly comprises a material and at least one tube. The material is configured for an additive textile manufacturing process, and the at least one tube is integrated with the material by the additive textile manufacturing process. The at least one tube defines a hollow channel and one or more perforations that extend between the hollow channel and an outer surface of the at least one tube.

16 Claims, 13 Drawing Sheets

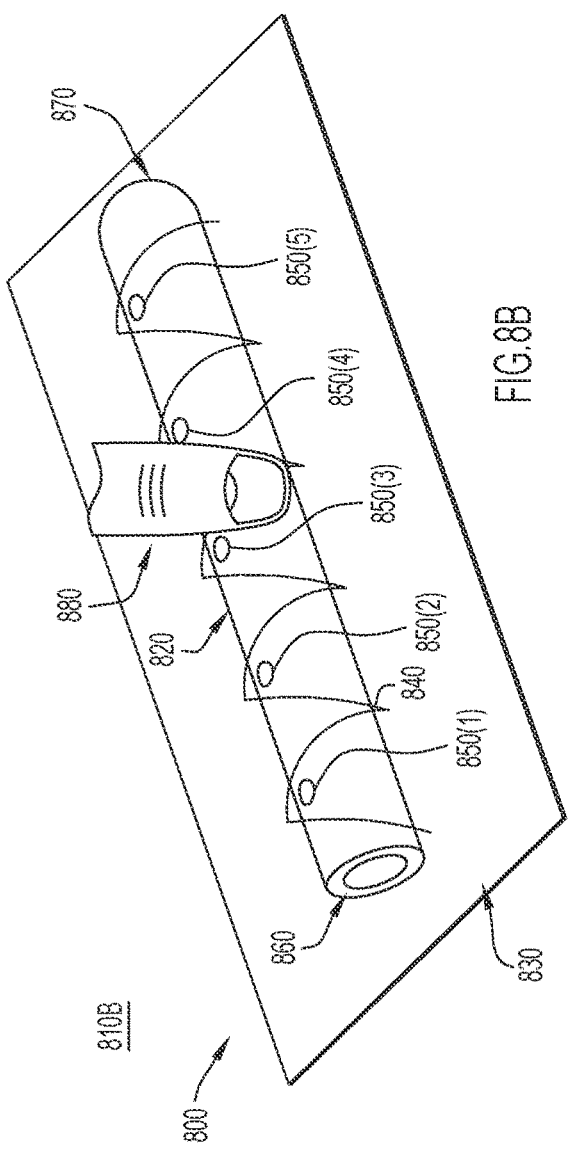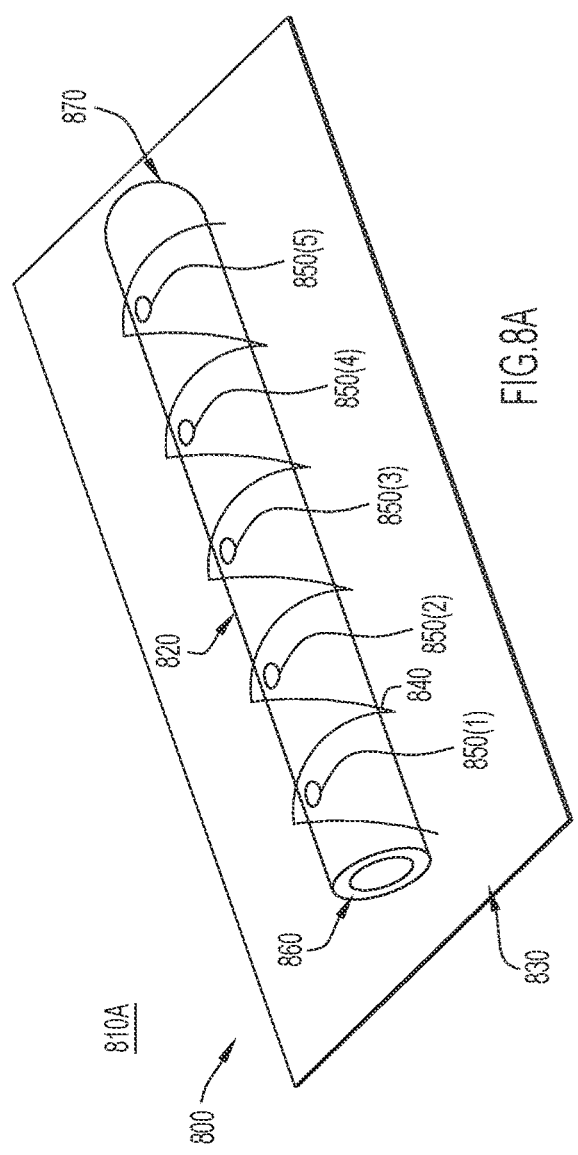

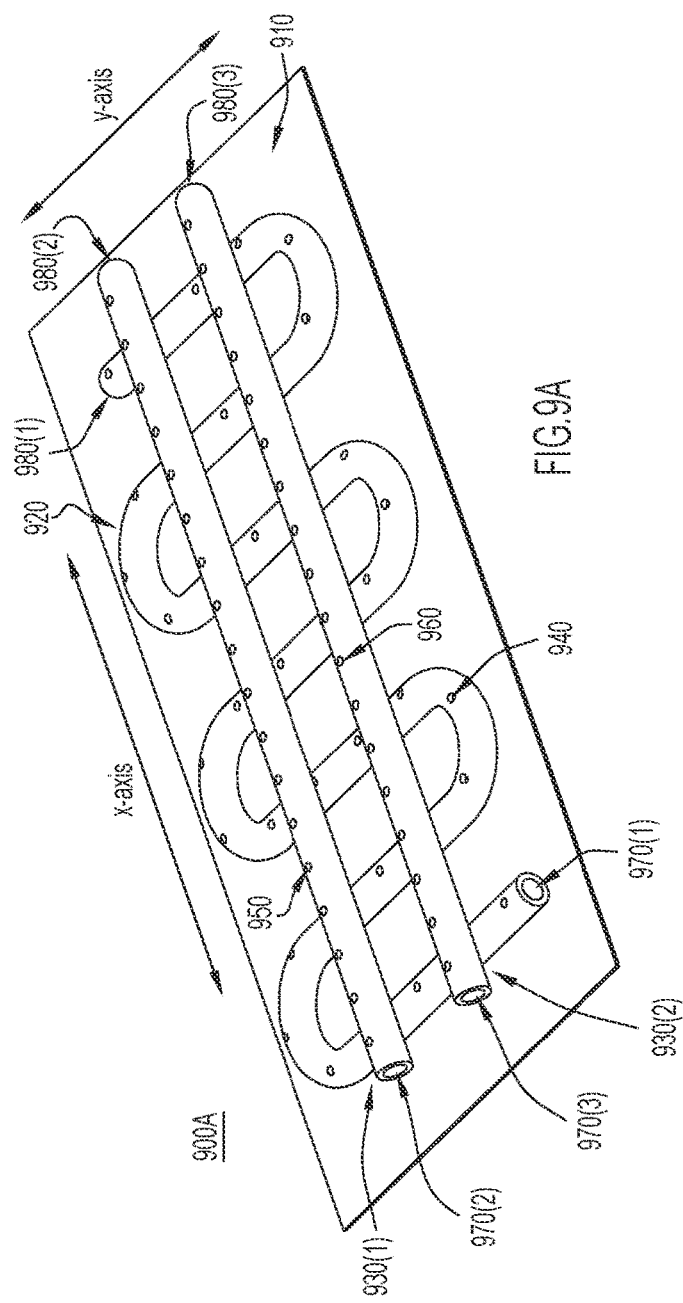
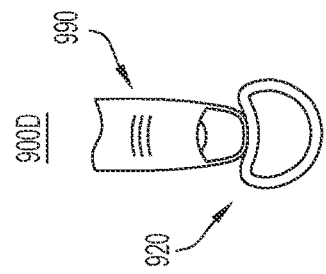
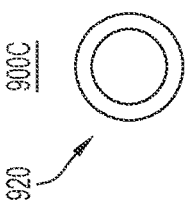
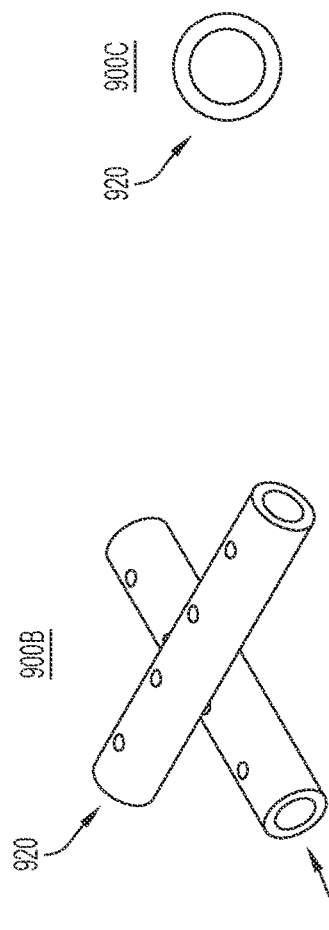
FIG. 9A
FIG. 9B
FIG. 9C
FIG. 9D

POROUS TUBE ASSEMBLY

CROSS REFERENCE TO RELATED APPLICATION

This application claims the benefit of U.S. Provisional Application No. 63/211,650, filed Jun. 17, 2021, the entirety of which is incorporated herein by reference.

TECHNICAL FIELD

The present disclosure relates to additive textile manufacturing processes including embroidery, weaving, knitting, and other related processes.

BACKGROUND

Traditionally, liquid is transported through a fabric via a process called "wicking." Wicking distributes liquid throughout a textile based on the fiber structure of the textile and adhesion of the liquid to the fibers. Wicking can be controlled by modifying the fiber structure and/or adding hydrophilic or hydrophobic coatings to the textile.

BRIEF DESCRIPTION OF THE DRAWINGS

FIGS. 8A and 8B illustrate a porous tube assembly configured for compression sensing applications, according to an example embodiment.

FIG. 9A illustrates a porous tube assembly configured for area sensing applications, according to an example embodiment.

FIG. 9B illustrates a magnified view of a section of the porous tube assembly of FIG. 9A, according to an example embodiment.

FIGS. 9C and 9D illustrate cross-sectional views of a porous tube of the porous tube assembly of FIG. 9A, according to an example embodiment.

DESCRIPTION OF EXAMPLE EMBODIMENTS

Overview

Figure 1:
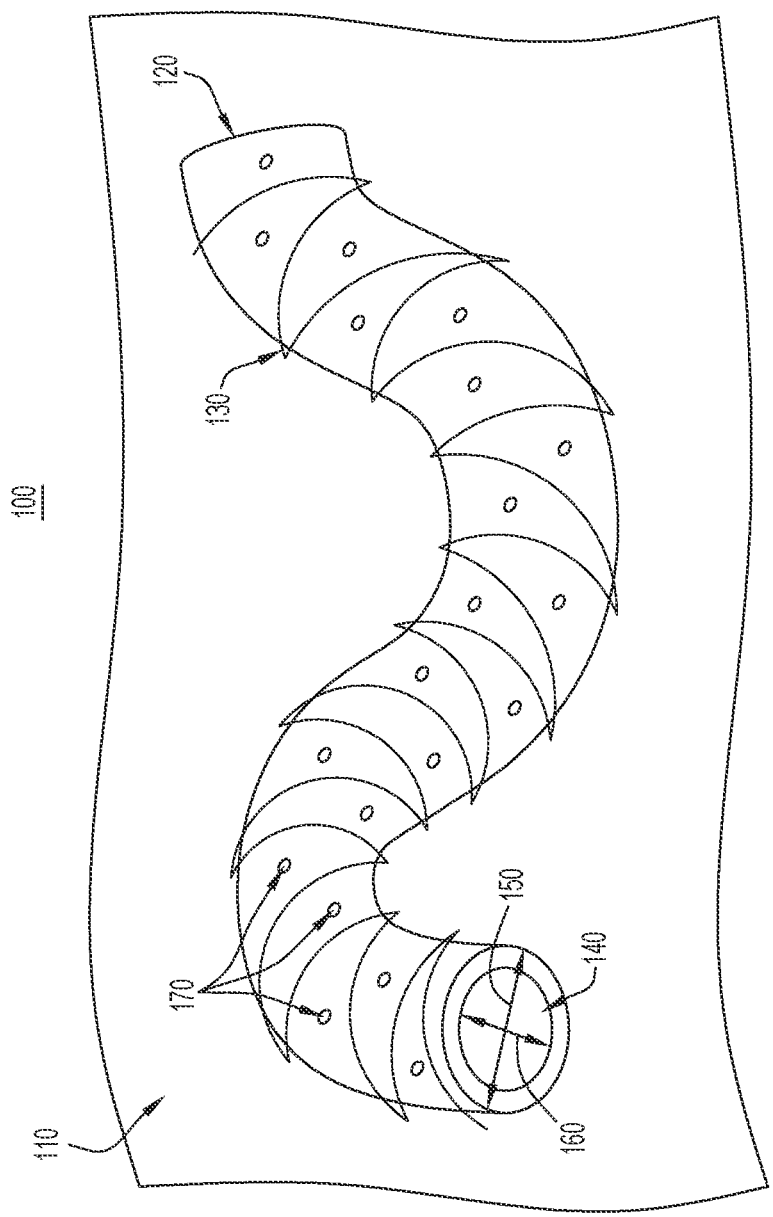
FIG. 1 illustrates a porous tube assembly, according to an example embodiment.

In one example embodiment, a porous tube assembly is described herein. The porous tube assembly comprises a material and at least one tube. The material is configured for an additive textile manufacturing process, and the at least one tube is integrated with the material by the additive textile manufacturing process. The at least one tube defines a hollow channel and one or more perforations that extend between the hollow channel and an outer surface of the at least one tube.

In another example embodiment, a method for manufacturing a porous tube assembly is described herein. The method comprises obtaining a material configured for an additive textile manufacturing process. The method further comprises, by the additive textile manufacturing process, integrating with the material at least one tube that defines a hollow channel and is perforated, before, during, or after the additive textile manufacturing process, with one or more perforations that extend between the hollow channel and an outer surface of the at least one tube.

In another example embodiment, an embroidery machine configured to manufacture a porous tube assembly is described herein. The embroidery machine comprises at least one needle and one or more processors. The one or more processors cause the at least one needle to fix, to a material, by an embroidery process, at least one tube that defines a hollow channel. The at least one tube is perforated, before, during, or after the embroidery process, with one or more perforations that extend between the hollow channel and an outer surface of the at least one tube.

Example Embodiments

Presented herein is a porous tube assembly. The porous tube assembly may include a porous tube and one or more materials with which the porous tube is integrated. The porous tube assembly may be created through embroidery, knitting, weaving, or any other suitable process (e.g., an additive textile manufacturing process). The porous tube may enable controlled transportation and distribution of one or more fluids (e.g., liquid or gas) by transporting/carrying the fluid in a hollow portion of the porous tube. During transportation, the fluid may exit the porous tube through perforations. In one example, the fluid may be distributed to the surrounding area or region of the material and/or throughout the material.

The porous tube assemblies described herein may improve control of fluid transport by distributing fluids directly throughout a porous tube for delivery to a material. Using embroidery, or any other suitable additive textile manufacturing process (e.g., knitting, weaving, etc.), the porous tube(s) may be arranged in custom placements/geometries for controlled transport and distribution of fluids throughout a material. The porous tube(s) may be arranged in any suitable placement/geometry based on the specific application and corresponding technical requirements. Thus, the porous tube assemblies described herein may be configurable to enable controlled fluid motion and distribution.

FIG. 1 illustrates porous tube assembly 100, according to an example embodiment. Porous tube assembly 100 includes material 110 and porous tube 120. In this example, porous tube 120 is fixed to material 110 by an embroidery process via stitching thread 130. Porous tube 120 may be embroidered to material 110 in any suitable pattern, spacing, routing, and/or design.

Material 110 may be any suitable material configured for an additive textile manufacturing process, such as textile, plastic, fabric, and/or any other suitable substance. In one example, material 110 may be flexible.

Porous tube 120 includes an outer surface/layer having a circular cross-sectional area of diameter 150. Diameter 150 may be any suitable value, such between 0.2 inches and 1 inch, inclusive. Diameter 150 may be constant or vary over the length of porous tube 120. Porous tube 120 may include any suitable material, such as latex or plastic film.

Porous tube 120 defines hollow channel 140. Hollow channel 140 extends along the center of porous tube 120, and has a circular cross-sectional area of diameter 160. Diameter 160 may be any suitable value, such between ⅛ inches and ⁹⁄₁₀ inches, inclusive. Diameter 160 may be constant or vary over the length of porous tube 120.

In one specific example, diameter 150 may be 0.2 inches, and diameter 160 may be ⅛ inches. In another example, diameter 150 may be 1 inch, and diameter 160 may be ⁹⁄₁₀ inches. Diameters 150 and 160 may be any suitable dimensions.

Hollow channel 140 may run through any suitable length of porous tube 120. In one example, hollow channel 140 may run an end-to-end length of porous tube 120 (e.g., in an "open-open" configuration). In another example, hollow channel 140 may run from one end of porous tube 120 to any point before the other end of porous tube 120 (e.g., in an "open-closed" configuration).

Porous tube 120 further defines perforations 170. Therefore, porous tube 120 may also be referred to as a "perforated" or "leaky" tube. Perforations 170 may extend between hollow channel 140 and the outer surface of porous tube 120. That is, perforations 170 may penetrate through the outer surface of porous tube 120 to hollow channel 140.

Although in FIG. 1 only three perforations are explicitly referenced as perforations 170, this is for ease of illustration only; the term "perforations 170" may be understood to refer to all the perforations shown in FIG. 1. Porous tube 120 may define any suitable number of perforations 170.

Perforations 170 may have any suitable size/radius. The number and size of the perforations may depend on a variety of factors, including a target amount of fluid to be distributed in material 110, a type of fluid (e.g., liquid or gas) to be distributed, an intended application for porous tube assembly 100, a desired flow rate of the fluid, a viscosity of the fluid, a compressibility and/or tension of porous tube 120 under loading, etc.

The structure of porous tube 120 may permit fluid (e.g., liquid or gas) to flow through hollow channel 140 and leak through perforations 170 into the surrounding area or region of material 110. In one example, material 110 may encourage the fluid to disperse within material 110 using wicking.

While porous tube 120 is fixed to material 110 by an embroidery process, it will be appreciated that a porous tube may be integrated with a material via any suitable additive textile manufacturing process (e.g., embroidery, weaving, knitting, etc.) in accordance with the techniques described herein. Thus, in other examples, a porous tube may be knitted or weaved into a material.

Porous tubes described herein may be any suitable size/configuration. For example, although porous tube 120 and hollow channel 140 include circular cross-sectional areas, in general a porous tube and/or hollow channel may include any suitably shaped cross-sectional area (e.g., square, etc.) in accordance with the techniques described herein. Furthermore, while channel 140 is centered within porous tube 120, in other examples, a channel may be off-center within a porous tube described herein. And while hollow channel 140 remains centered over the length of porous tube 120, in general the cross-sectional location of a hollow channel may vary over the length of a porous tube.

Moreover, perforations described herein may be positioned in any suitable location/arrangement in a porous tube. In one example, the perforations may be arranged in a line or any other suitable shape on the porous tube. In another example, the perforations may be dispersed throughout the porous tube in a scattered arrangement. The perforations may be evenly or irregularly spaced. The specific arrangement of the perforations defined by the porous tube may be configured based on the intended application for the porous tube (e.g., based on the desired flow in the material for a given placement/geometry).

Figure 2:
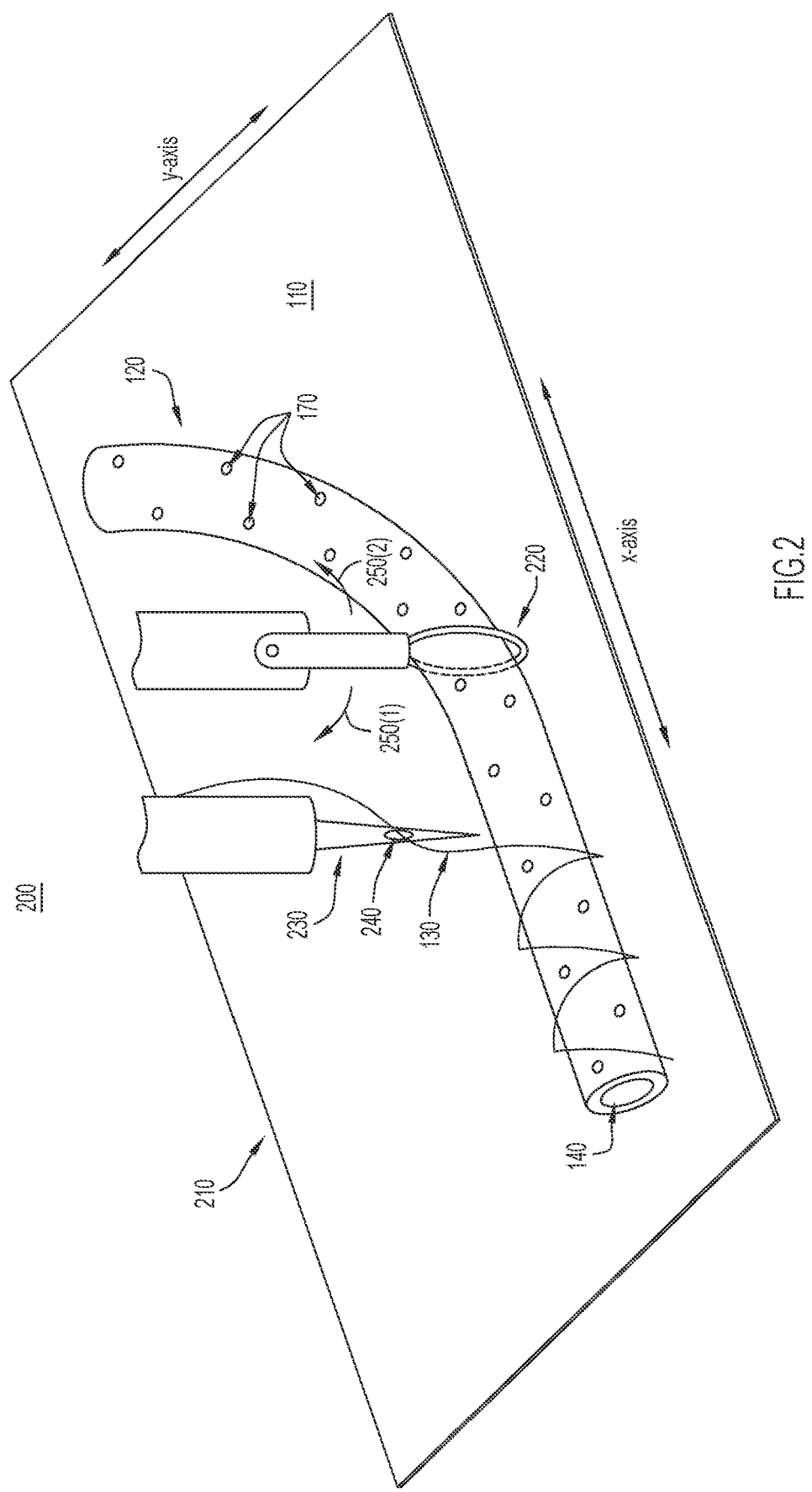
FIG. 2 illustrates an embroidery machine configured to produce a porous tube assembly, according to an example embodiment.

With continuing reference to FIG. 1, FIG. 2 illustrates embroidery machine 200 configured to produce porous tube assembly 100, according to an example embodiment. Embroidery machine 200 integrates frame 210, swing foot 220, and stitching needle 230. Frame 210 secures material 110 during an embroidery process. Swing foot 220 is configured as a loop that holds porous tube 120. Stitching needle 230 defines hole 240, which is threaded with stitching thread 130.

Embroidery machine 200 may perform an embroidery process to integrate porous tube 120 with material 110. In this example, porous tube 120 is pre-perforated—that is, porous tube 120 is perforated with perforations 170 before the embroidery process. Porous tube 120 may be pre-perforated during the original manufacturing process of porous tube 120 or later (but, in any event, before the embroidery process begins).

Embroidery machine 200 may, by an embroidery process, integrate porous tube 120 with material 110. In one example, embroidery machine 200 may obtain material 110. For instance, an operator of embroidery machine 200 may secure material 110 to frame 210. Stitching needle 230 may automatically fix porous tube 120 to material 110 by the embroidery process via stitching thread 130. Frame 210 may be coupled to a pantograph configured to move in the x- and/or y-directions and thereby control the positioning of frame 210 and material 110. Swing foot 220 may be configured to move in a side-to-side motion, as represented by arrows 250(1) and 250(2), and thereby guide the placement of porous tube 120 on material 110 as stitching needle 230 fixes porous tube 120 to material 110. In this example, embroidery machine 200 embroiders porous tube 120 to material 110 using a W-head technique, in which stitching thread 130 forms a zig-zag pattern over porous tube 120.

In the example of FIG. 2, porous tube 120 is pre-perforated (e.g., during the original manufacturing process of porous tube 120). In another example, embroidery machine 200 may obtain a tube (e.g., a non-porous/unperforated tube having a smooth surface) and perforate the tube using at least one needle (e.g., a threadless/empty needle). That is, embroidery machine 200 may stick the threadless needle through porous tube assembly 100. The (non-porous/unperforated) tube may include a hollow channel as discussed above.

In one example, the threadless needle may be different from stitching needle 230 (e.g., embroidery machine 200 may include multiple needles, at least one of which is stitching needle 230 and another is the threadless needle). In another example, threadless needle may be the same as stitching needle 230 (e.g., stitching thread 130 may be added to or removed from stitching needle 230 depending on whether embroidery machine 200 is to perform embroidery or puncturing operations).

Embroidery machine 200 may puncture the tube with the threadless needle before, during, or after the embroidery process. More specifically, embroidery machine 200 may puncture the tube with the threadless needle: (1) before embroidering the tube to the material with stitching needle 230 (i.e., before stitching/fixing the tube to the material); (2) while embroidering the tube to the material with stitching needle 230 (i.e., while stitching/fixing the tube to the material); or (3) after embroidering the tube to the material with stitching needle 230 (i.e., after stitching/fixing the tube to the material).

Embroidery machine 200 may puncture the tube such that the threadless needle creates perforations that extend between a hollow channel of the tube and an outer surface of the tube. Thus, if the hollow channel is centered in the tube, the threadless needle may puncture through the outer surface and into the center of the tube where the hollow channel is located. Or, if the hollow channel is off-center in the tube, the threadless needle may puncture through the outer surface and into the off-center location of the hollow channel. Embroidery machine 200 may puncture any suitable portion of the tube with the threadless needle, depending on the placement of the hollow channel.

In another example, a first embroidery machine may embroider a (non-perforated) tube to the material with a threaded needle, and a second embroidery machine may perforate the tube with a threadless needle. In still another example, a first embroidery machine may perforate a (non-perforated) tube with a threadless needle to create a porous tube, and a second embroidery machine may embroider the porous tube with a threaded needle. Other embodiments may be envisioned.

Figure 3:
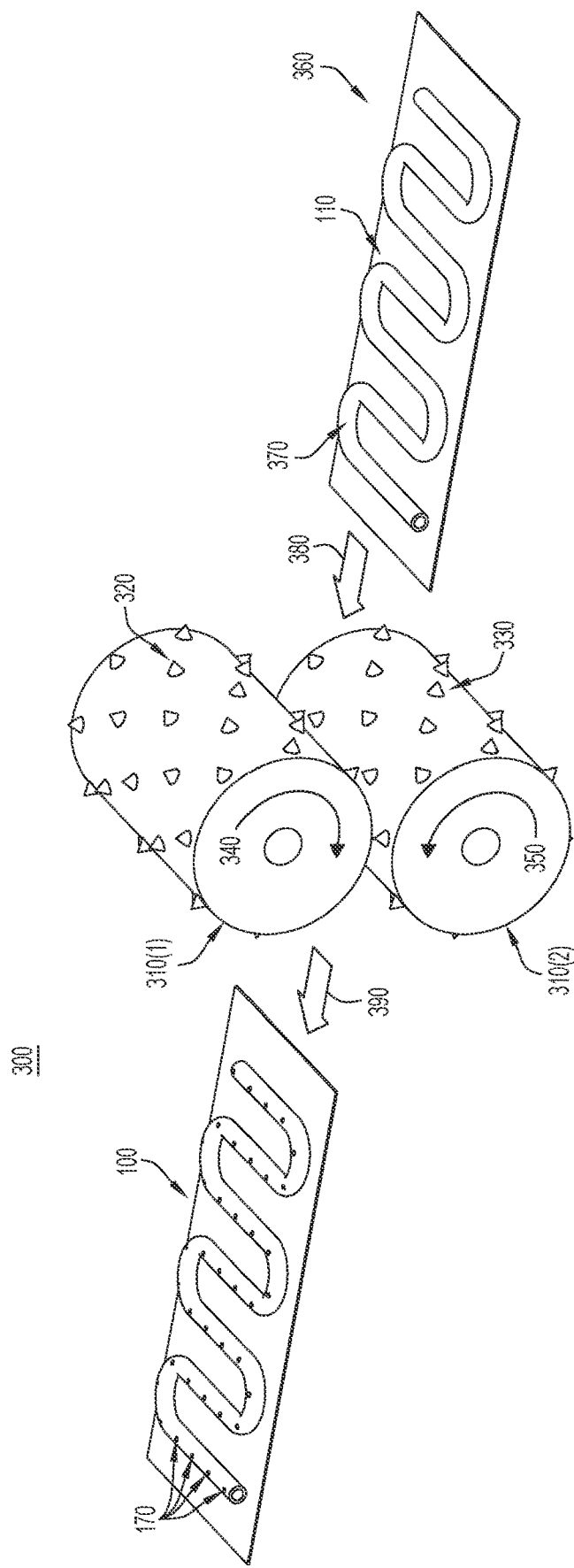
FIG. 3 illustrates a system configured to perforate a tube, according to an example embodiment.

With continuing reference to FIG. 1, FIG. 3 illustrates system 300 configured to create one or more perforations, according to an example embodiment. System 300 includes cylindrical rollers 310(1) and 310(2). Cylindrical rollers 310(1) and 310(2) include perforators 320 and 330, respectively.

Although in FIG. 3 only one perforator is explicitly referenced as one of perforators 320 and one perforator is explicitly referenced as one of perforators 330, this is for ease of illustration only; the term "perforators 320" may be understood to refer to all the perforators on cylindrical rollers 310(1), and the term "perforators 330" may be understood to refer to all the perforators on cylindrical rollers 310(2).

Cylindrical rollers 310(1) and 310(2) may be configured to rotate about respective longitudinal axes in opposite rotational directions, as represented by arrows 340 and 350. In operation, system 300 obtains, as input, tube assembly 360. Tube assembly 360 includes tube 370 and material 110. Tube 370 may be a non-porous/unperforated tube. Tube 370 may be integrated with material 110 by an additive textile manufacturing process. In one example, tube 370 may be embroidered to material 110 by embroidery machine 200 (FIG. 2).

As represented by arrow 380, tube assembly 360 may be fed (manually or automatically) into system 300. Perforators 320 and 330 may create perforations 170 throughout tube assembly 360 by puncturing tube 370. As represented by arrow 390, system 300 may output porous tube assembly 100, which includes perforations 170.

In this example, system 300 adds perforations after tube 370 has been embroidered to material 110. However, more generally, system 300 may puncture tube 370 with perforators 320 and 330 before, during, or after the embroidery process. For example, system 300 may puncture tube 370 before tube 370 has been embroidered to material 110. That is, system 300 may obtain tube 370, puncture tube 370 to produce porous tube 120, and output porous tube 120. In one specific example, embroidery machine 200 (FIG. 2) may obtain porous tube 120 from system 300 and embroider porous tube 120 to material 110 to produce tube assembly 100.

Cylindrical rollers 310(1) and 310(2) may include any suitable number of perforators 320 and 330. Perforators 320 and 330 may be any suitable shape and material capable of puncturing a tube to create perforations. For example, perforators 320 and 330 may include spikes, needles, etc.

While system 300 includes two cylindrical rollers 310(1) and 310(2), in general any suitable number of rollers may be used in any suitable arrangement. While both cylindrical rollers 310(1) and 310(2) include perforators 320 and 330, in other examples any suitable number of cylindrical rollers may include perforators. For instance, in one embodiment, either cylindrical roller 310(1) or cylindrical roller 310(2) may include perforators 320 or 330, and the other may be smooth.

In another example, cylindrical rollers 310(1) and 310(2) may be replaced with one or more presses/stamps or any suitable alternative configured to perforate a tube. At least one of the presses may be flat with perforators disposed on at least one side of the press. System 300 may push the perforator-side of the press against the tube such that the perforators puncture the tube and create perforations.

System 300 may be integrated with embroidery machine 200 (FIG. 2) as parts of a larger system. In one example, embroidery machine 200 may be configured to embroider tube 370 to material 110 to produce tube assembly 360, which may in turn be manually or automatically fed into system 300. System 300 may obtain tube assembly 360, puncture tube 370, and output porous tube assembly 100. In another example, system 300 may obtain a tube (e.g., without a material), puncture the tube to produce porous tube 120, and output porous tube 120. Embroidery machine 200 may obtain porous tube 120 manually or automatically and embroider porous tube 120 to material 110 to produce porous tube assembly 100.

Techniques described herein may include embroidering a tube to any suitable material(s). As discussed further below, a tube may embroidered to two stacked fabrics (FIG. 4), a plastic sheet stacked on a fabric (FIG. 5), or any other suitable material or combination of materials configured for an embroidery process.

Figure 4:
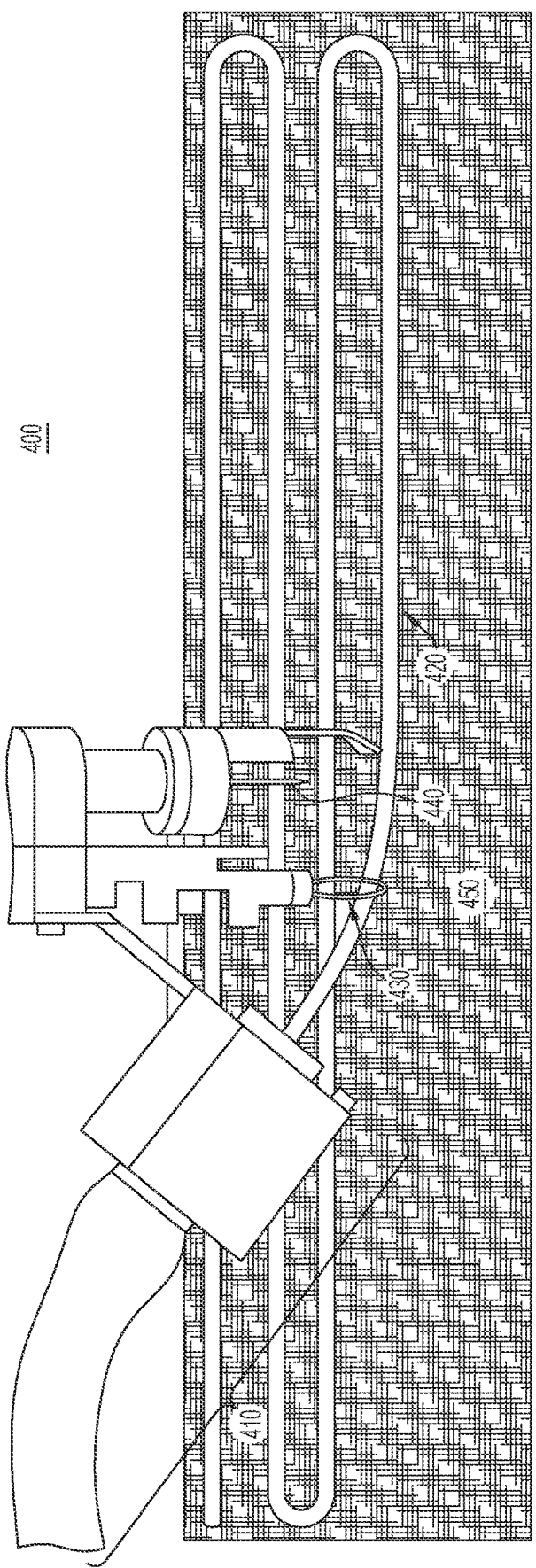
FIG. 4 illustrates a system configured to embroider a porous tube to two stacked fabrics, according to an example embodiment.

With reference to FIG. 4, FIG. 4 illustrates system 400, according to an example embodiment. System 400 includes feeder 410, tube 420, swing foot 430, stitching needle 440, and stacked fabrics 450. Feeder 410 may be configured to dispense tube 420 onto stacked fabrics 450. As tube 420 is being dispensed, system 400 may, using stitching needle 440, embroider tube 420 to stacked fabrics 450. In this example, tube 420 is dispensed in a snaking configuration; however, it will be appreciated that a tube described herein may be arranged on a material in any suitable configuration or pattern.

Tube 420 may define a hollow channel. In one example, tube 420 may be perforated before it is laid down onto stacked fabrics 450 (e.g., tube 420 may be pre-perforated as part of a manufacturing process of tube 420 or by a perforation system such as system 300 (FIG. 3)). In another example, tube 420 may be perforated while it is being laid down onto stacked fabrics 450 (e.g., using a threadless needle of system 400). In still another example, tube 420 may be perforated after it is laid down onto stacked fabrics 450 (e.g., by a threadless needle of system 400 or by a perforation system such as system 300 (FIG. 3)). Once perforated, tube 420 may define one or more perforations that extend between the hollow channel and an outer surface of tube 420.

Figure 5:
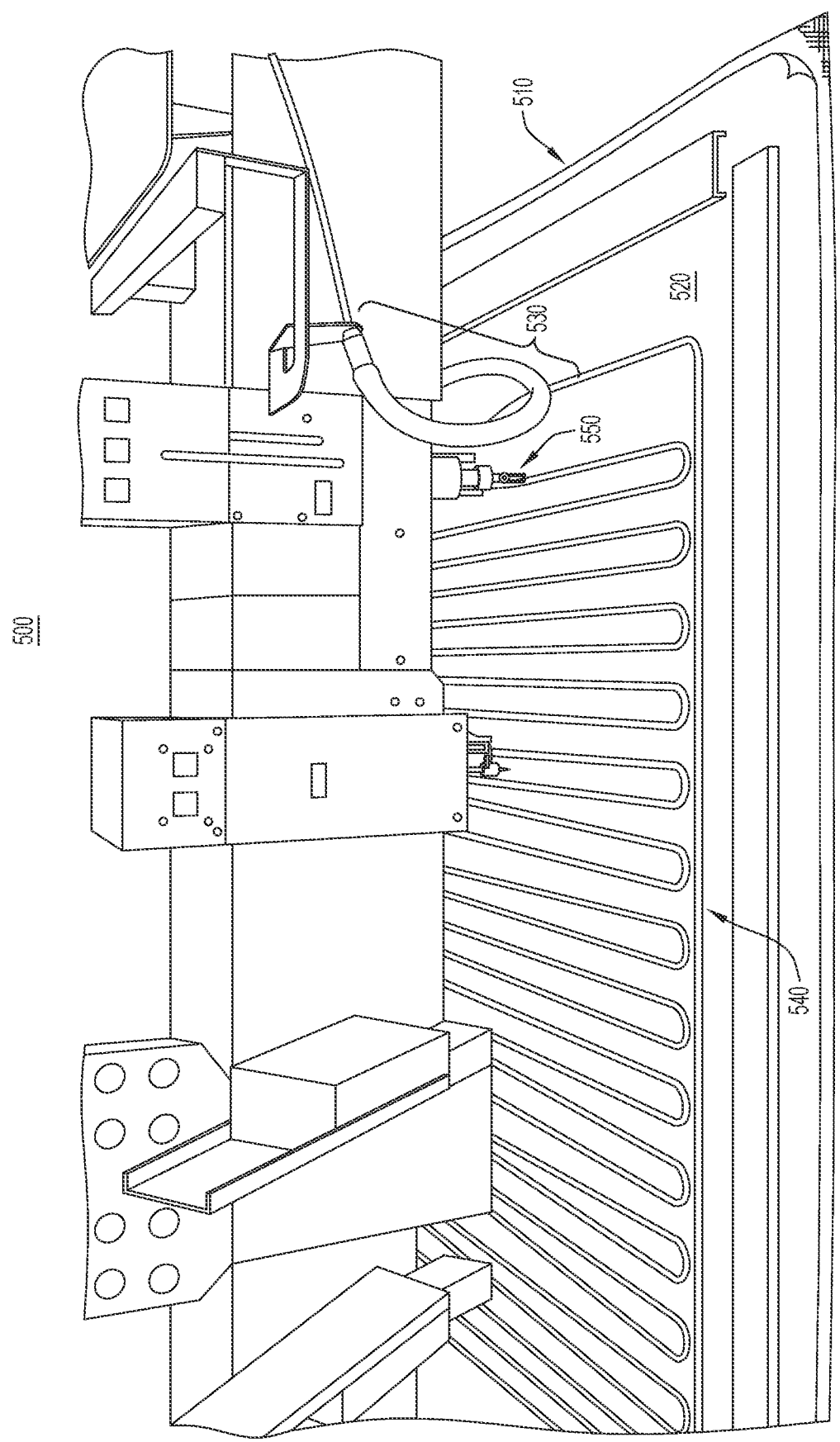
FIG. 5 illustrates a system configured to embroider a porous tube to a plastic sheet stacked on a fabric, according to an example embodiment.

FIG. 5 illustrates system 500, according to an example embodiment. System 500 includes frame 510, stacked materials 520, feeder 530, tube 540, and stitching needle 550. Frame 510 secures stacked materials 520 during the embroidery process. In this example, stacked materials 520 include a sheet of plastic stacked on top of a fabric. Feeder 530 is configured to dispense tube 540 onto stacked materials 520. Like tube 420 (FIG. 4), tube 540 is dispensed in a snaking configuration; however, in general a tube described herein may be arranged on a material in any suitable configuration or pattern. Stitching needle 550 may embroider tube 540 to stacked materials 520 using a stitching thread.

Tube 540 may define a hollow channel and, like tube 420, may be perforated before, while, or after it is laid down onto stacked materials 520. Once perforated, tube 540 may define one or more perforations that extend between the hollow channel and an outer surface of tube 540.

Figure 6:
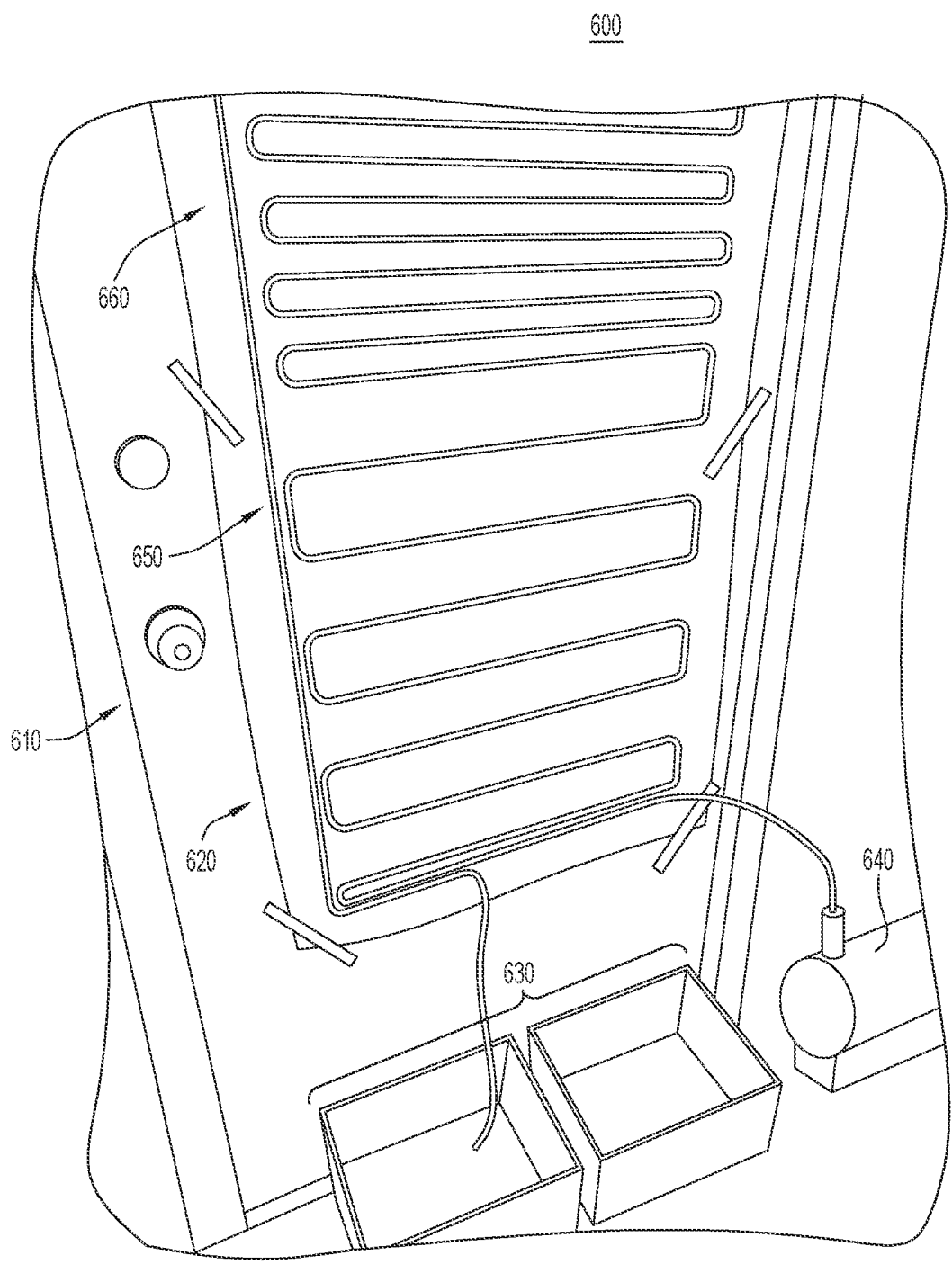
FIG. 6 illustrates a system configured for evaporative cooling applications, according to an example embodiment.

FIGS. 6, 7, 8A, 8B, 9A-9D, 10A, and 10B illustrate porous tube assemblies configured for specific applications. Turning first to FIG. 6, FIG. 6 illustrates a system 600 configured for evaporative cooling applications, according to an example embodiment. System 600 includes door 610, porous tube assembly 620, water bins 630, and peristaltic motor 640. Porous tube assembly 620 includes porous tube 650 integrated with material 660 by an additive textile manufacturing process (e.g., embroidery). Porous tube 650 defines a hollow channel and one or more perforations that extend between the hollow channel and an outer surface of porous tube 650.

As shown, porous tube assembly 620 is attached to door 610 and thus hangs vertically. Arranged in a snaking configuration, porous tube 650 is concentrated more densely at the top of porous tube assembly 620 and less densely at the bottom.

In operation, peristaltic motor 640 provides pressure to push water (or any other suitable fluid configured for evaporative cooling applications) into porous tube 650. The water may flow through porous tube 650 (unimpeded by any stitching thread), leak out through perforations in porous tube 650, and seep into material 660. The water may evaporate from material 660, cooling porous tube assembly 620 and, by extension, door 610 and/or any other suitable material or structure in thermal contact with porous tube assembly 620. Thus, porous tube assembly 620 lowers the temperature of door 610 via evaporative cooling. Any excess water (e.g., water that does not leak out through the perforations) may drain from porous tube 650 into water bins 630.

Because it is oriented vertically, porous tube assembly 620 may be designed to account for the effects of gravity and wicking—which may pull water down the textile—to maintain an even distribution of water within material 660. One measure to prevent water from gathering disproportionately at the bottom of material 660 is the configuration of porous tube 650 on material 660. As noted, porous tube 650 is concentrated more densely at the top of porous tube assembly 620 and less densely at the bottom; this causes porous tube 650 to release more water near the top of porous tube assembly 620. Thus, gravity and/or wicking pull the water down to evenly distribute water throughout material 660.

Another measure to distribute water evenly throughout material 660 is to arrange the perforations accordingly in porous tube 650. In one example, porous tube 650 may have a higher density of perforations near the top of material 660 than the bottom. This configuration may permit more water to seep into the top of material 660. Moreover, the size/radius of the perforations may vary over porous tube 650 (e.g., the perforations may be greater near the top of material 660 than the bottom). Thus, the porosity of porous tube 650 may be tuned to gravity.

Although the example of FIG. 6 endeavors to maintain an equal distribution of water throughout material 660, in other examples it may be preferable to distribute water unequally for evaporative cooling. For example, if a greater concentration of water is desired at the bottom of material 660, the snaking configuration of porous tube 650 may have a constant periodicity. Or, if a greater concentration of water is desired at the bottom of material 660, porous tube 650 may be concentrated even more densely at the top of porous tube assembly 620. The target distribution of water within material 660 may be achieved by tuning any suitable parameter(s) (e.g., the configuration of porous tube 650, the location/density of the perforations on porous tube 650, the pressure delivered by peristaltic motor 640, etc.). Moreover, it will be appreciated that peristaltic motor 640 may be substituted for any suitable source of water pressure.

Figure 7:
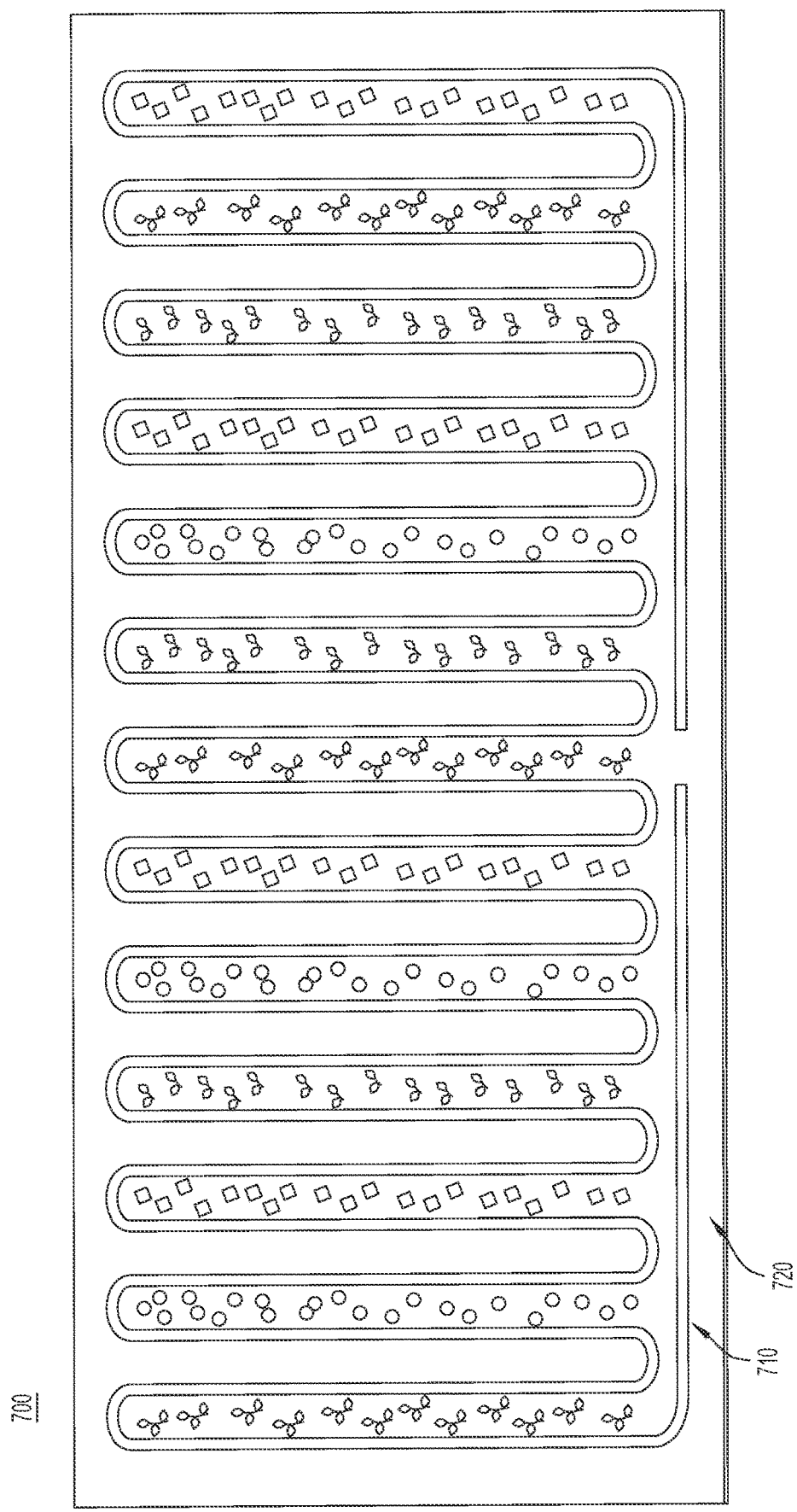
FIG. 7 illustrates a porous tube assembly configured for gardening applications, according to an example embodiment.

FIG. 7 illustrates a porous tube assembly 700 configured for gardening applications, according to an example embodiment. Porous tube assembly 700 includes porous tube 710 integrated with material 720 by an additive textile manufacturing process (e.g., embroidery). Porous tube 710 defines a hollow channel and one or more perforations that extend between the hollow channel and an outer surface of porous tube 710. Although in the example of FIG. 7 it is arranged in a snaking configuration, porous tube 710 may in general be arranged in any suitable pattern.

Porous tube assembly 700 is oriented horizontally for use as a garden mat. In operation, a peristaltic motor (or any other suitable pressure source—not shown) may apply pressure to a fluid. The peristaltic motor may be connected to at least one end of porous tube 710, thereby encouraging tube 710 to transport and distribute the fluid throughout material 720 to seeds and/or plants placed on porous tube assembly 700. The fluid may include nourishment for the seeds/plants, such as water, liquid plant food, etc. In further examples, porous tube assembly 700 may be buried under soil, and/or soil may be placed on top of porous tube assembly 700.

FIGS. 8A and 8B illustrates a porous tube assembly 800 configured for compression sensing applications, according to an example embodiment. More specifically, FIG. 8A illustrates porous tube assembly 800 in uncompressed state 810A, and FIG. 8B illustrates porous tube assembly 800 in compressed state 810B. Porous tube assembly 800 includes porous tube 820, material 830, and stitching thread 840. Porous tube 820 defines a hollow channel and perforations 850(1)-850(5), which extend between the hollow channel and an outer surface of porous tube 820. Porous tube 820 is embroidered to material 830 via stitching thread 840.

Porous tube 820 is compressible and includes open end 860 and closed end 870. Closed end 870 may be hermetically sealed via any suitable mechanism. In one example, porous tube 820 may be manufactured with closed end 870. In another example, closed end 870 may be sealed during the embroidery process, e.g., by stitching shut closed end 870 with stitching thread 840. In still another example, closed end 870 may be sealed with a cap that is inserted manually or automatically. Closed end 870 may be sealed/closed before, during, or after the additive textile manufacturing (e.g., embroidery) process.

In operation, pressure is applied at open end 860, causing air (or any suitable fluid) to escape through perforations 850(1)-850(5). The pressure may be applied by any suitable mechanism, such as a fan, motor, etc. In uncompressed state 810A, air leaks from all perforations 850(1)-850(5); however, in compressed state 810B, air leaks from a subset of perforations 850(1)-850(5). More specifically, object 880 (e.g., a finger) compresses porous tube 820 between perforations 850(3) and 850(4). As a result, air continues to escape from perforations 850(1)-850(3), but not from perforations 850(4) or 850(5), which are hermetically isolated by object 880.

Thus, less air is able to escape from porous tube 820 in compressed state 810B than in uncompressed state 810A. In compressed state 810B, three out of five perforations 850 (1)-850(5) are in hermetic communication with the air; in uncompressed state 810A, air may escape from all five perforations 850(1)-850(5). Therefore, in one example, the amount of air that escapes from porous tube 820 in compressed state 810B may be reduced, relative to uncompressed state 810A, by 60%.

More generally, as object 880 approaches open end 860, less air is permitted to escape; as object 880 approaches closed end 870, more air is permitted to escape. By this principle, porous tube assembly 800 may be used as or integrated with a compression sensor to determine the placement of a load (e.g., object 880) on material 830. That is, the number of perforations 850(1)-850(5) that leak air depend on the placement of object 880 on material 830, and the amount of resulting air leakage may be measured and quantified to determine the location of object 880. In one example, the amount of air that escapes from porous tube 820 may be proportional to (e.g., change linearly with) the location of object 880 on porous tube 820.

In one example, perforations 850(1)-850(5) may be approximately equal in size and distributed uniformly over the end-to-end length of porous tube 820. In other examples, perforations 850(1)-850(5) may differ in size, and may be arranged in any suitable pattern/configuration. While five perforations 850(1)-850(5) are shown in FIGS. 8A and 8B, in general a compression sensor described herein may have any suitable number of perforations.

FIG. 9A illustrates porous tube assembly 900A configured for area sensing applications, according to an example embodiment. Porous tube assembly 900A includes material 910, porous tube 920, porous tube 930(1), and porous tube 930(2). Porous tubes 920, 930(1), and 930(2) each defines a hollow channel. Porous tube 920 further defines perforations 940, porous tube 930(1) perforations 950, and porous tube 930(2) perforations 960. Perforations 940, 950, and 960 extend between the applicable hollow channel and an outer surface of porous tubes 920, 930(1), and 930(2), respectively. Porous tubes 920, 930(1), and 930(2) include open ends 970(1)-970(3) and closed ends 980(1)-980(3), respectively.

Although in FIG. 9A only one of perforations 940, 950, and 960 are explicitly referenced as perforations 940, 950, and 960, this is for ease of illustration only; the term "perforations 940," "perforation 950," and "perforations 960" may be understood to refer to all the perforations shown in FIG. 9A for porous tubes 920, 930(1), and 930(2), respectively. Porous tubes 920, 930(1), and 930(2) may include any suitable number of perforations 940, 950, and 960.

Porous tubes 920, 930(1), and 930(2) are integrated with material 910 by an additive textile manufacturing process (e.g., embroidery) in a grid formation. Porous tube 920 is stitched to material 910 in a snaking (e.g., sinusoidal) configuration, and porous tubes 930(1) and 930(2) are stitched to material 910 in a straight line over porous tube 920. In other examples, porous tubes 930(1) and 930(2) may be stitched under porous tube 920, or alternatingly interweaved with porous tube 920. Porous tubes 920, 930(1), and 930(2) may be stitched to material 910 in any suitable order and/or simultaneously.

Porous tube assembly 900A may be used as or integrated with an area sensor to determine the placement of a compression source on material 910. For example, porous tube assembly 900A may be used as a pressure mat.

In operation, pressure is applied at open ends 970(1)-970 (3), causing air (or any suitable fluid) to escape through the perforations 940, 950, and 960. The pressure may be applied by any suitable mechanism, such as a fan, motor, etc. When porous tube assembly 900A is compressed at a given location, some amount of air may be prevented from escaping through perforations 940, 950, and 960. This may be based on a similar principle as discussed above in relation to FIGS. 8A and 8B. Porous tube 920 may help determine the location of a compression source along the y-axis, and porous tubes 930(1) and 930(2) may help determine the location of the compression source along the x-axis.

Porous tube assembly 900A may include any suitable number of porous tubes arranged in any suitable grid configuration. For example, as shown in FIG. 9A, porous tube assembly 900A may include a "hybrid" configuration (e.g., porous tube 920 in a snaking configuration and porous tubes 930(1) and 930(2) in straight lines). In other examples, porous tube assembly 900A may include two perpendicularly-oriented porous tubes, each arranged in a snaking configuration. One porous tube may be oriented to measure the location of the compression source along the x-axis, and the other along the y-axis. In another example, porous tube assembly 900A may include one series of straight porous tubes oriented along the x-axis, and another series of straight porous tubes oriented along the y-axis. In this example, the porous tubes may be weaved together. In still another example, porous tube assembly 900A may include one porous tube that is arranged in a snaking configuration along both the x- and y-axes. Other embodiments may be envisioned.

While gaps are shown between porous tubes 920, 930(1), and 930(2), in other examples the porous tube(s) may be arranged in greater densities on material 910, such that there are little or no gaps. This may increase the locational sensitivity of porous tube assembly 900A.

FIG. 9B illustrates a magnified view 900B of a section of porous tube assembly 900A. In particular, magnified view 900B shows a section where porous tube 920 overlaps with porous tube 930(1). When the overlapping region is compressed, porous tube assembly 900A may help determine the x- and y-location of the compression source based on the corresponding decrease in air that is escaping from porous tube 920 and porous tube 930(1).

FIGS. 9C and 9D illustrates cross-sectional views 900C and 900D of porous tube 920. Cross-sectional view 900C shows an uncompressed state of porous tube 920, and cross-sectional view 900D shows a compressed state of porous tube 920. In the uncompressed state, air flows freely through porous tube 920 and escapes through all perforations 940. In the compressed state, finger 990 compresses porous tube 920, hermetically isolating at least some perforations 940 from the air. The corresponding decrease in air escaping from 920 may enable pressure-based locational sensing along the y-axis. Porous tubes 930(1) and 930(2) may be similarly compressed to enable pressure-based locational sensing along the x-axis.

Figure 10A:
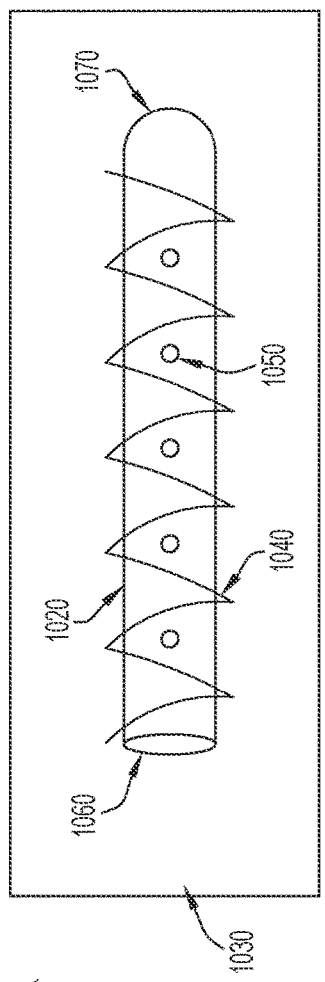
FIGS. 10A and 10B illustrate a porous tube assembly configured for tension sensing applications, according to an example embodiment.
Figure 10B:
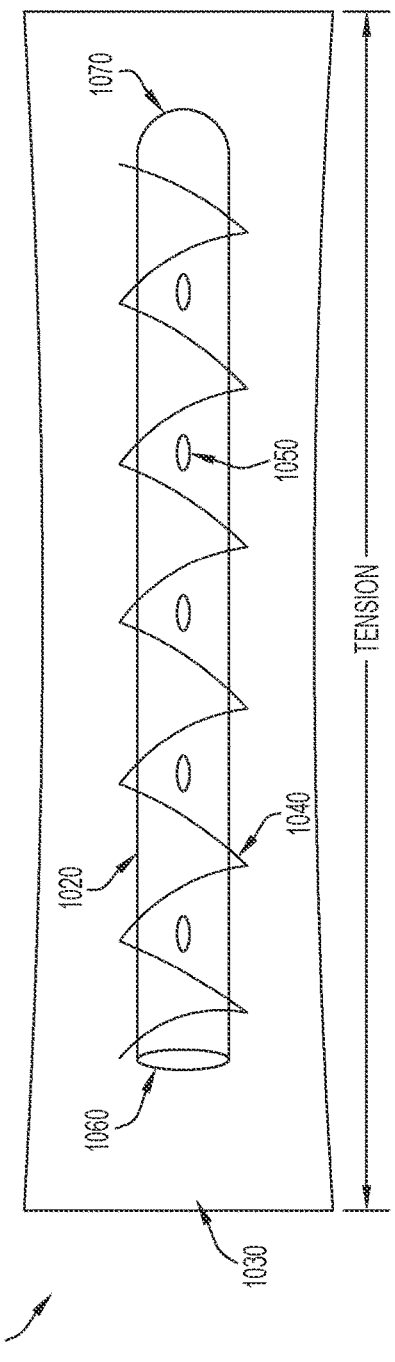

FIGS. 10A and 10B illustrate porous tube assembly 1000 configured for tension sensing applications, according to an example embodiment. More specifically, FIG. 10A illustrates porous tube assembly 1000 in relaxed state 1010A (in which there is little or no tension on porous tube assembly 1000), and FIG. 10B illustrates porous tube assembly 100 in tensioned state 1010B. Porous tube assembly 1000 includes porous tube 1020, material 1030, and stitching thread 1040. Porous tube 1020 is embroidered to material 1030 via stitching thread 1040. Porous tube 1020 defines a hollow channel and perforations 1050 that extend between the hollow channel and an outer surface of porous tube 1020.

Although in FIGS. 10A and 10B only one of perforations 1050 is explicitly referenced as perforations 1050, this is for ease of illustration only; the term "perforations 1050" may be understood to refer to all the perforations shown in FIGS. 10A and 10B for porous tube 1020. Porous tube 1020 may include any suitable number of perforations 1050.

Porous tube 1020 is stretchable and includes open end 1060 and closed end 1070. Closed end 1070 may be hermetically sealed via any suitable mechanism. In one example, porous tube 1020 may be manufactured with closed end 1070. In another example, closed end 1070 may be sealed during the embroidery process, e.g., by stitching shut closed end 1070 with stitching thread 1040. In still another example, closed end 1070 may be sealed with a cap that is inserted manually or automatically. Closed end 1070 may be sealed/closed before, during, or after the additive textile manufacturing (e.g., embroidery) process.

In operation, pressure is applied at open end 1060, causing air (or any suitable fluid) to escape through perforations 1050. The pressure may be applied by any suitable mechanism, such as a fan, motor, etc. In relaxed state 1010A, perforations 1050 are closed/small and have a smaller volume, and as a result release relatively little air. In tensioned state 1010B, porous tube 1020 is stretched lengthwise, expanding the volumes of perforations 1050 and thereby permitting more air to escape than in relaxed state 1010A. As a result, air flow is less impeded in tensioned state 1010B.

More generally, the more relaxed porous tube 1020, the less air is permitted to escape; the more tensioned porous tube 1020, the more air is permitted to escape. By this principle, porous tube assembly 1000 may be used as or integrated with a tension sensor to determine the tension on porous tube 1020. That is, the amount of air that leaks from perforations 1050 may depend on how much tension porous tube 1020 is under, and the corresponding change in resistance (air leakage) may be quantified and correlated to tension load.

In one example, perforations 1050 may be approximately equal in size and distributed uniformly over the end-to-end length of porous tube 1020. In other examples, perforations 1050 may differ in size, and may be arranged in any suitable pattern/configuration. While five perforations 1050 are shown in FIGS. 10A and 10B, in general a tension sensor described herein may have any suitable number of perforations.

Porous tube assemblies 800, 900A, and/or 1000 may enable low-cost pressure, locational, and/or tension sensing and analysis, for instance, in Virtual Reality (VR), Augmented Reality (AR), and/or smart textile applications. The resulting compression, area, and/or tension sensors may be used to detect the magnitude and/or location of a pressure or tension source applied to porous tube assemblies 800, 900A, and/or 1000. In one example, any combination of porous tube assemblies 800, 900A, and/or 1000 may be integrated into a larger system configured for compression, area, and/or tension sensing. Compression, area, and/or tension sensors described herein may be created through embroidery, weaving, knitting, and/or any other suitable process (e.g., an additive textile manufacturing process).

It will be appreciated that the techniques described herein may be implemented for a wide range of applications, and need not necessarily be limited to the applications discussed in relation to FIGS. 6, 7, 8A, 8B, 9A-9D, 10A, and 10B. Examples of such applications may include: thermal feedback of air in haptic devices for VR or AR; air pressure locational feedback for haptic devices in VR or AR; car seat air conditioning/heating delivery mechanism; active airflow control and exchange in shoes; fluid epoxy transport and distribution in composite curing applications; cooling/heating in upholstery; cooling/heating in blankets; high surface area distribution of liquid in swamp coolers or evaporative coolers; continuous distribution of fluids in bandages for burn victims; controlled distribution of antiseptic in carpets; air moisture removal in dehumidifier; self-oiling cooking surfaces; drying of a floor (e.g., a saturated carpet) by placing the porous tube assembly on the floor and sucking the liquid from the floor to a reservoir; and cooling using air. Other applications may be envisioned.

Figure 11:
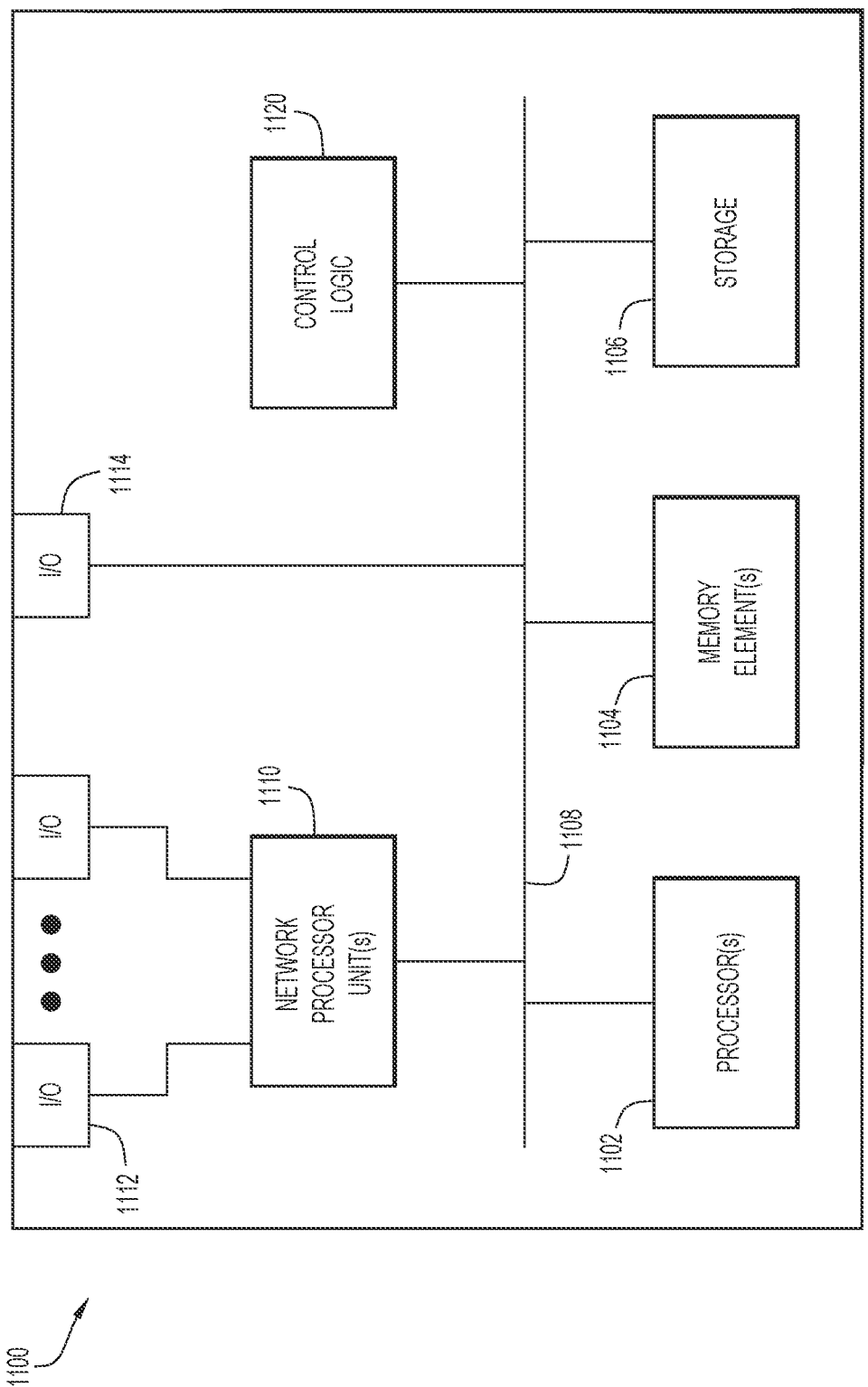
FIG. 11 illustrates a hardware block diagram of a computing device configured to perform functions associated with operations discussed herein, according to an example embodiment.

Referring to FIG. 11, FIG. 11 illustrates a hardware block diagram of a computing device 1100 that may perform functions associated with operations discussed herein in connection with the techniques depicted in FIGS. 1-7, 8A, 8B, 9A-9D, 10A, and 10B. In various embodiments, a computing device, such as computing device 1100 or any combination of computing devices 1100, may be configured as any entity/entities as discussed for the techniques depicted in connection with FIGS. 1-7, 8A, 8B, 9A-9D, 10A, and 10B in order to perform operations of the various techniques discussed herein.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interfaces 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1120 can include instructions that, when executed, cause processor(s) 1102 to perform operations, which can include, but not be limited to, providing overall control operations of computing device 1100; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory elements 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 1100 for transfer onto another computer readable storage medium.

To the extent that embodiments presented herein relate to the storage of data, the embodiments may employ any number of any databases, data stores or storage structures (e.g., files, databases, data structures, data or other repositories, etc.) to store information.

Figure 12:
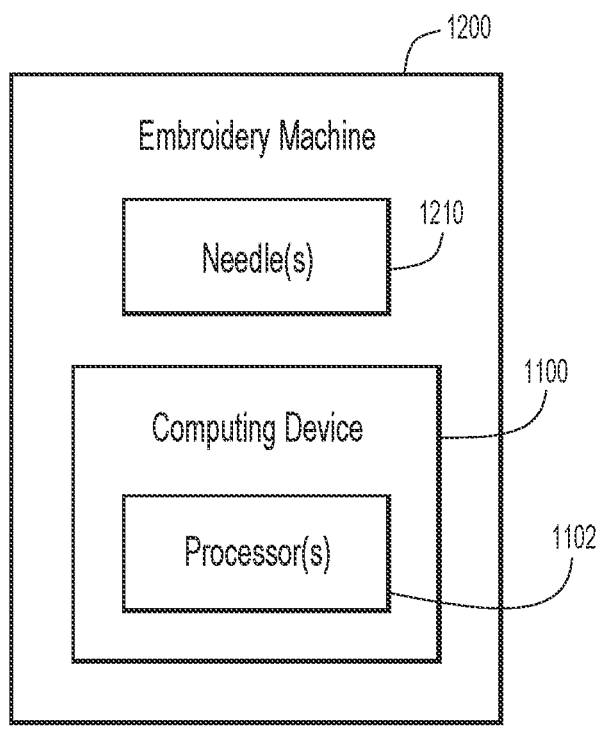
FIG. 12 illustrates a block diagram of an embroidery machine configured to perform operations described herein, according to an example embodiment.

With continuing reference to FIG. 11, FIG. 12 illustrates a block diagram of embroidery machine 1200 configured to perform operations described herein. Embroidery machine 1200 includes at least one needle 1210 and computing device 1100, including one or more processors 1102. One or more processors 1102 may cause at least one needle 1210 to fix, to a material, by an embroidery process, at least one tube that defines a hollow channel. The at least one tube may be perforated, before, during, or after the embroidery process, with one or more perforations that extend between the hollow channel and an outer surface of the at least one tube.

Computing device 1100 may cause embroidery machine 1200 to perform one or more operations described herein. Computing device 1100 may cause embroidery machine 1200 to perform one or more embroidery operations such as controlling the zig-zag motion of a pantograph, the motion of a swing foot that guides the tube, the timing of a stitching needle, the timing of a rotary hook located under the material that catches the thread when the needle punctures the material, etc. Computing device 1100 may also cause embroidery machine 1200 to perform one or more puncturing operations such as perforating a tube.

Figure 13:
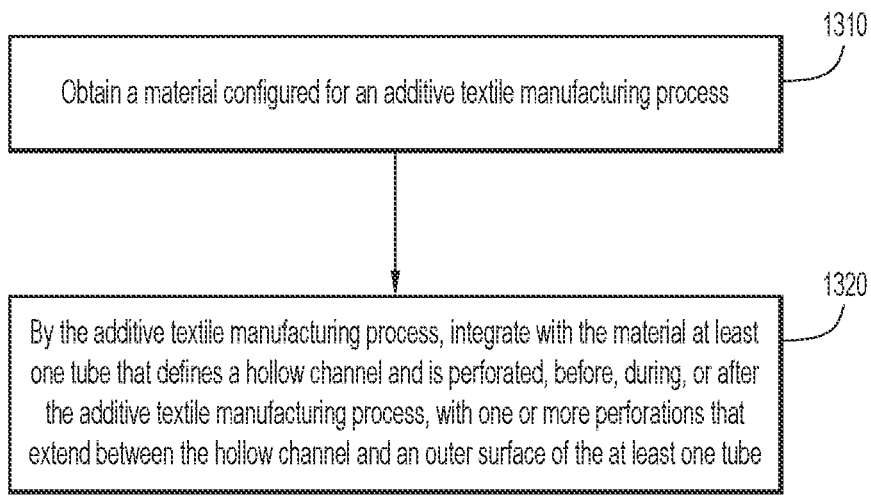
FIG. 13 is a flowchart of a method for performing functions associated with operations discussed herein, according to an example embodiment.

FIG. 13 is a flowchart of an example method 1300 for performing functions associated with operations discussed herein. Method 1300 may be performed by any suitable additive textile manufacturing machine, such as embroidery machine 200 (FIG. 2), embroidery machine 1200 (FIG. 1200), a weaving machine, a knitting machine, etc.

At operation 1310, the additive textile manufacturing machine obtains a material configured for an additive textile manufacturing process. At operation 1320, the additive textile manufacturing machine, by the additive textile manufacturing process, integrates with the material at least one tube that defines a hollow channel and is perforated, before, during, or after the additive textile manufacturing process, with one or more perforations that extend between the hollow channel and an outer surface of the at least one tube.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, an apparatus is provided. The apparatus comprises: a material configured for an additive textile manufacturing process; and at least one tube that is integrated with the material by the additive textile manufacturing process, wherein the at least one tube defines a hollow channel and one or more perforations that extend between the hollow channel and an outer surface of the at least one tube.

In one example, the at least one tube is compressible and includes a closed end. In a further example, a compression sensor is provided that comprises the apparatus.

In one example, the at least one tube is integrated with the material in a grid formation. In a further example, an area sensor is provided that comprises the apparatus.

In one example, the at least one tube is stretchable and includes a closed end. In a further example, a tension sensor is provided that comprises the apparatus.

In one example, the additive textile manufacturing process is an embroidery process, and the at least one tube is fixed to the material by the embroidery process.

In one form, a method is provided. The method comprises: obtaining a material configured for an additive textile manufacturing process; and by the additive textile manufacturing process, integrating with the material at least one tube that defines a hollow channel and is perforated, before, during, or after the additive textile manufacturing process, with one or more perforations that extend between the hollow channel and an outer surface of the at least one tube.

In one example, integrating with the material the at least one tube includes: integrating with the material at least one pre-perforated tube.

In one example, the method further comprises: creating the one or more perforations by puncturing the at least one tube with one or more perforators of at least one roller or press.

In one example, integrating with the material the at least one tube includes fixing the at least one tube to the material by an embroidery process. In a further example, the method further comprises: creating the one or more perforations by puncturing the at least one tube with at least one needle of an embroidery machine that performs the embroidery process.

In one example, integrating with the material the at least one tube includes: integrating with the material at least one compressible tube that includes an end that is closed before, during, or after the additive textile manufacturing process.

In another example, integrating with the material the at least one tube includes: integrating with the material the at least one tube in a grid formation.

In another example, integrating with the material the at least one tube includes: integrating with the material at least one stretchable tube that includes an end that is closed before, during, or after the additive textile manufacturing process.

In another form, another apparatus is provided. The other apparatus comprises: at least one needle; and one or more processors that cause the at least one needle to fix, to a material, by an embroidery process, at least one tube that defines a hollow channel, wherein the at least one tube is perforated, before, during, or after the embroidery process, with one or more perforations that extend between the hollow channel and an outer surface of the at least one tube.

In another example, the one or more processors cause the at least one needle to fix, to the material, at least one pre-perforated tube.

In another example, a system comprises the other apparatus; and at least one roller or press including one or more perforators that create the one or more perforations by puncturing the at least one tube.

In another example, the one or more processors further cause at least one threadless needle to create the one or more perforations by puncturing the at least one tube.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only.

What is claimed is:

1. A method comprising:
obtaining a material configured for an additive textile manufacturing process;
by the additive textile manufacturing process, moving a stitching thread with a needle to puncture the material with the stitching thread at a first location on the material positioned beyond a perimeter of at least one tube and moving the stitching thread to pass the stitching thread from the first location around the perimeter of the at least one tube to a second location on the material positioned beyond the perimeter of the at least one tube such that the stitching thread extends across the at least one tube to stitch to the material the at least one tube, wherein the at least one tube defines a hollow channel and is perforated, before, during, or after the additive textile manufacturing process, with one or more perforations that extend between the hollow channel and an outer surface of the at least one tube; and
moving the needle to puncture the at least one tube to create the one or more perforations in the at least one tube.

2. The method of claim 1, wherein the needle is moved to puncture the at least one tube to create the one or more perforations in the at least one tube before the additive textile manufacturing process such that the at least one tube is pre-perforated.

3. The method of claim 1, further comprising:
creating the one or more perforations after the additive textile manufacturing process by moving the needle to puncture the at least one tube.

4. The method of claim 1, comprising creating one or more additional perforations by puncturing the at least one tube with an additional needle.

5. The method of claim 1, comprising passing the stitching thread from the second location around the perimeter of the at least one tube to a third location on the material positioned beyond the perimeter of the at least one tube to form a zig-zag pattern of the stitching thread over the at least one tube.

6. The method of claim 1, comprising:
holding the at least one tube with respect to the material with a holder while the stitching thread is passed around the perimeter of the at least one tube; and
moving the holder to guide placement of the at least one tube on the material while the stitching thread is passed around the perimeter of the at least one tube.

7. The method of claim 6, wherein the holder comprises a loop extending around the perimeter of the at least one tube to hold the at least one tube with respect to the material.

8. The method of claim 1, comprising directing fluid through the at least one tube after stitching the at least one tube to the material, wherein the one or more perforations of the at least one tube distributes the fluid along the material.

9. The method of claim 1, comprising perforating the at least one tube with a plurality of perforations comprising the one or more perforations, the plurality of perforations being linearly aligned along the at least one tube.

10. The method of claim 1, comprising bending the at least one tube along the material prior to stitching to the material the at least one tube such that the at least one tube extends along a plurality of axes that are transverse to one another along a surface of the material upon being integrated with the material.

11. The method of claim 1, wherein a length of the stitching thread extending from the first location to the second location is greater than a diameter of a cross-section of the hollow channel.

12. A method comprising:
obtaining a material configured for an additive textile manufacturing process;
by the additive textile manufacturing process, moving a stitching thread with a needle to integrate with the material a tube that defines a hollow channel and is perforated, before, during, or after the additive textile manufacturing process, with one or more perforations that extend between the hollow channel and an outer surface of the tube;
moving the needle to puncture the tube to create the one or more perforations in the tube; and
using a motor to direct fluid through the tube for distribution along the material via the one or more perforations.

13. The method of claim 12, wherein the tube is contained within a boundary of a surface of the material.

14. The method of claim 12, wherein the tube is curved to extend along a plurality of axes that are transverse to one another along the material.

15. A method comprising:
- obtaining a material configured for an additive textile manufacturing process;
- moving a needle to puncture a tube before, during, or after the additive textile manufacturing process, wherein the tube defines a hollow channel, and puncturing the tube provides one or more perforations that extend between the hollow channel and an outer surface of the tube; and
- by the additive textile manufacturing process, moving a stitching thread with the needle to integrate the tube with the material.

16. The method of claim 15, wherein the tube extends along a first axis, and a diameter of a cross-section of the hollow channel of the tube is less than half of a length of the material, the length extending along a second axis that is perpendicular to the first axis.

\* \* \* \* \*